United States Patent
Vassigh et al.

(10) Patent No.: US 12,265,746 B2
(45) Date of Patent: Apr. 1, 2025

(54) CONTROLLING VISUAL INDICATORS IN AN AUDIO RESPONSIVE ELECTRONIC DEVICE, AND CAPTURING AND PROVIDING AUDIO USING AN API, BY NATIVE AND NON-NATIVE COMPUTING DEVICES AND SERVICES

(71) Applicant: Roku, Inc., San Jose, CA (US)

(72) Inventors: Ali Vassigh, San Jose, CA (US); Soren Riise, San Jose, CA (US); Robert Burdick, Los Altos, CA (US); Kevin Cooper, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/481,141

(22) Filed: Sep. 21, 2021

(65) Prior Publication Data
US 2022/0004349 A1    Jan. 6, 2022

Related U.S. Application Data

(63) Continuation of application No. 16/828,048, filed on Mar. 24, 2020, now Pat. No. 11,126,389, which is a
(Continued)

(51) Int. Cl.
G06F 3/16 (2006.01)
G06F 3/14 (2006.01)
G10L 15/22 (2006.01)

(52) U.S. Cl.
CPC ............ *G06F 3/14* (2013.01); *G06F 3/167* (2013.01); *G10L 15/22* (2013.01); *G08C 2201/31* (2013.01); *G10L 2015/223* (2013.01)

(58) Field of Classification Search
CPC .................................. G06F 3/167; G10L 15/22
See application file for complete search history.

(56) References Cited

U.S. PATENT DOCUMENTS 6,747,566 B2    6/2004  Hou
7,072,686 B1    7/2006  Schrager et al.
(Continued)

FOREIGN PATENT DOCUMENTS

EP    2897126 A1    7/2015
EP    2899717 A2    7/2015
(Continued)

OTHER PUBLICATIONS

Chan, K. Y., Low, S. Y., Nordholm, S., Yiu, K. F. C., & Ling, S. H. (Oct. 2009). Speech recognition enhancement using beamforming and a genetic algorithm. In 2009 Third International Conference on Network and System Security (pp. 510-515). IEEE.*
(Continued)

*Primary Examiner* — Bryan S Blankenagel
(74) *Attorney, Agent, or Firm* — Sterne, Kessler, Goldstein & Fox P.L.L.C.

(57) ABSTRACT

Disclosed herein are embodiments for controlling visual indicators of an audio responsive electronic device. In some embodiments, an audio responsive electronic device operates by receiving audio input, and then analyzing the audio input to identify an intended target of the audio input. The intended target may be one of a plurality of electronic devices or services which are native or non-native to the audio responsive electronic device. The audio responsive electronic device transmits the audio input to the identified intended target. A reply message is received from the intended target. Then, the audio responsive electronic device controls its visual indicators using information in the reply message, to thereby provide visual feedback to a user. Also disclosed herein are embodiments for capturing and providing audio to an application according to an application programming interface of a media device.

18 Claims, 12 Drawing Sheets

Related U.S. Application Data continuation of application No. 15/646,379, filed on Jul. 11, 2017, now Pat. No. 10,599,377.

(56) References Cited

U.S. PATENT DOCUMENTS

| | | |
|---|---|---|
| 7,295,882 B2 | 11/2007 | Champion et al. |
| 7,653,761 B2 | 1/2010 | Juster et al. |
| 8,094,891 B2 | 1/2012 | Andreasson |
| 8,340,975 B1 | 12/2012 | Rosenburger |
| 8,620,658 B2 | 12/2013 | Nakade et al. |
| 9,111,522 B1 * | 8/2015 | Worley, III ............ H04R 3/002 |
| 9,329,831 B1 | 5/2016 | Fullerton et al. |
| 9,443,529 B2 * | 9/2016 | Eddington, Jr. .... G10L 19/0212 |
| 9,689,960 B1 | 6/2017 | Barton et al. |
| 9,721,570 B1 | 8/2017 | Beal et al. |
| 9,729,994 B1 | 8/2017 | Eddins et al. |
| 9,779,735 B2 | 10/2017 | Civelli et al. |
| 9,830,924 B1 | 11/2017 | Degges, Jr. et al. |
| 9,898,250 B1 | 2/2018 | Williams et al. |
| 9,953,634 B1 * | 4/2018 | Pearce .................. G10L 15/063 |
| 9,955,319 B2 | 4/2018 | Matus et al. |
| 10,034,135 B1 | 7/2018 | Provost et al. |
| 10,147,439 B1 * | 12/2018 | Kristjansson ......... G10L 21/034 |
| 10,210,863 B2 | 2/2019 | Garner et al. |
| 10,237,256 B1 | 3/2019 | Pena et al. |
| 10,255,917 B2 | 4/2019 | Carey et al. |
| 10,271,093 B1 | 4/2019 | Jobanputra et al. |
| 10,353,480 B2 | 7/2019 | Roman et al. |
| 10,354,658 B2 | 7/2019 | Wilberding |
| 10,366,699 B1 | 7/2019 | Dharia et al. |
| 10,425,981 B2 | 9/2019 | Asnis et al. |
| 10,452,350 B2 | 10/2019 | Asnis et al. |
| 10,455,322 B2 | 10/2019 | Garner et al. |
| 10,489,111 B2 | 11/2019 | Jeong |
| 10,524,070 B2 | 12/2019 | Kadri |
| 10,529,332 B2 | 1/2020 | Lemay et al. |
| 10,565,998 B2 | 2/2020 | Wilberding |
| 10,565,999 B2 | 2/2020 | Wilberding |
| 10,593,328 B1 * | 3/2020 | Wang .................. H04L 65/1059 |
| 10,599,377 B2 | 3/2020 | Vassigh et al. |
| 10,770,067 B1 * | 9/2020 | Prasad ............. H04N 21/42203 |
| 10,777,197 B2 | 9/2020 | Wood et al. |
| 11,057,664 B1 * | 7/2021 | Dodge ............. H04N 21/42204 |
| 11,062,702 B2 | 7/2021 | Wood et al. |
| 11,062,710 B2 | 7/2021 | Wood et al. |
| 11,126,389 B2 | 9/2021 | Vassigh et al. |
| 11,145,298 B2 | 10/2021 | Maker et al. |
| 11,646,025 B2 | 5/2023 | Wood et al. |
| 11,664,026 B2 | 5/2023 | Maker et al. |
| 11,804,227 B2 | 10/2023 | Wood et al. |
| 11,924,511 B2 | 3/2024 | Wood et al. |
| 11,935,537 B2 | 3/2024 | Maker et al. |
| 11,961,521 B2 | 4/2024 | Wood et al. |
| 2002/0091511 A1 | 7/2002 | Hellwig et al. |
| 2002/0126035 A1 | 9/2002 | Hou |
| 2003/0040907 A1 | 2/2003 | Chang et al. |
| 2004/0066941 A1 | 4/2004 | Amada et al. |
| 2004/0131207 A1 | 7/2004 | Park |
| 2005/0216949 A1 | 9/2005 | Candelora et al. |
| 2005/0254640 A1 | 11/2005 | Ohki et al. |
| 2006/0020662 A1 | 1/2006 | Robinson |
| 2006/0200350 A1 | 9/2006 | Attwater et al. |
| 2006/0212478 A1 | 9/2006 | Plastina et al. |
| 2006/0235701 A1 | 10/2006 | Cane et al. |
| 2007/0113725 A1 | 5/2007 | Oliver et al. |
| 2007/0174866 A1 | 7/2007 | Brown et al. |
| 2007/0276866 A1 | 11/2007 | Bodin et al. |
| 2007/0291956 A1 | 12/2007 | Loether et al. |
| 2007/0296701 A1 | 12/2007 | Pope et al. |
| 2008/0154613 A1 | 6/2008 | Haulick et al. |
| 2008/0312935 A1 | 12/2008 | Mau, II |
| 2008/0317292 A1 | 12/2008 | Baker et al. |
| 2009/0044687 A1 | 2/2009 | Sorber |
| 2009/0055185 A1 | 2/2009 | Nakade et al. |
| 2009/0055426 A1 | 2/2009 | Kalasapur et al. |
| 2009/0063414 A1 | 3/2009 | White et al. |
| 2009/0138507 A1 | 5/2009 | Burckart et al. |
| 2009/0164516 A1 | 6/2009 | Svendsen et al. |
| 2009/0172538 A1 | 7/2009 | Bates et al. |
| 2009/0222392 A1 | 9/2009 | Martin et al. |
| 2009/0243909 A1 | 10/2009 | Reams et al. |
| 2009/0248413 A1 | 10/2009 | Liu et al. |
| 2009/0325602 A1 | 12/2009 | Higgins et al. |
| 2009/0328087 A1 | 12/2009 | Higgins et al. |
| 2010/0333163 A1 | 12/2010 | Daly |
| 2011/0077751 A1 | 3/2011 | Redi |
| 2011/0261950 A1 | 10/2011 | Yamaguchi |
| 2011/0294490 A1 * | 12/2011 | Faenger .................. H04W 4/18 455/419 |
| 2011/0295843 A1 | 12/2011 | Ingrassia et al. |
| 2012/0062729 A1 | 3/2012 | Hart et al. |
| 2012/0128176 A1 | 5/2012 | Acero et al. |
| 2012/0146788 A1 | 6/2012 | Wilson et al. |
| 2012/0185247 A1 | 7/2012 | Tzirkel-Hancock et al. |
| 2012/0215537 A1 | 8/2012 | Igarashi |
| 2012/0224714 A1 | 9/2012 | Couse et al. |
| 2013/0060571 A1 | 3/2013 | Soemo et al. |
| 2013/0147770 A1 | 6/2013 | Dahl et al. |
| 2013/0238326 A1 | 9/2013 | Kim et al. |
| 2013/0300651 A1 | 11/2013 | Lim |
| 2013/0304758 A1 | 11/2013 | Gruber et al. |
| 2014/0081630 A1 | 3/2014 | Jung |
| 2014/0163978 A1 | 6/2014 | Basye et al. |
| 2014/0168130 A1 * | 6/2014 | Hirai ........................ G06F 3/02 345/173 |
| 2014/0172953 A1 | 6/2014 | Blanksteen |
| 2014/0184905 A1 | 7/2014 | Mountain |
| 2014/0222436 A1 | 8/2014 | Binder et al. |
| 2014/0254806 A1 * | 9/2014 | Fonseca, Jr ............. G10L 25/51 381/56 |
| 2014/0270695 A1 | 9/2014 | Banks |
| 2014/0278437 A1 | 9/2014 | Shen et al. |
| 2014/0309993 A1 | 10/2014 | Goussard |
| 2014/0337016 A1 | 11/2014 | Herbig et al. |
| 2014/0363024 A1 | 12/2014 | Apodaca |
| 2014/0365226 A1 | 12/2014 | Sinha |
| 2014/0365526 A1 | 12/2014 | Sinha |
| 2014/0372109 A1 | 12/2014 | Iyer |
| 2015/0018992 A1 | 1/2015 | Griffiths et al. |
| 2015/0032456 A1 | 1/2015 | Wait |
| 2015/0036573 A1 | 2/2015 | Malik et al. |
| 2015/0046157 A1 * | 2/2015 | Wolff ....................... G10L 25/51 704/231 |
| 2015/0100322 A1 | 4/2015 | Lee et al. |
| 2015/0154647 A1 | 6/2015 | Suwald et al. |
| 2015/0169284 A1 | 6/2015 | Quast et al. |
| 2015/0194152 A1 | 7/2015 | Katuri et al. |
| 2015/0206529 A1 | 7/2015 | Kwon et al. |
| 2015/0276254 A1 | 10/2015 | Nemcek et al. |
| 2015/0281878 A1 | 10/2015 | Roundtree et al. |
| 2015/0296289 A1 | 10/2015 | Lakkundi et al. |
| 2015/0331666 A1 | 11/2015 | Bucsa et al. |
| 2015/0373393 A1 | 12/2015 | Lee et al. |
| 2016/0038848 A1 | 2/2016 | Chen et al. |
| 2016/0071513 A1 | 3/2016 | Sun et al. |
| 2016/0095063 A1 | 3/2016 | Vigier et al. |
| 2016/0098992 A1 | 4/2016 | Renard et al. |
| 2016/0099007 A1 | 4/2016 | Alvarez et al. |
| 2016/0142840 A1 | 5/2016 | Das et al. |
| 2016/0142875 A1 | 5/2016 | Awoniyi-Oteri et al. |
| 2016/0148614 A1 | 5/2016 | Yoon et al. |
| 2016/0150472 A1 | 5/2016 | Yoon et al. |
| 2016/0171971 A1 * | 6/2016 | Suskind ............ H04M 1/72427 704/260 |
| 2016/0192069 A1 | 6/2016 | McIntosh et al. |
| 2016/0212488 A1 | 7/2016 | Os et al. |
| 2016/0217790 A1 | 7/2016 | Sharifi |
| 2016/0267913 A1 | 9/2016 | Kim et al. |
| 2016/0314546 A1 | 10/2016 | Malnati et al. |
| 2016/0322047 A1 | 11/2016 | Kawashima et al. |
| 2017/0011742 A1 | 1/2017 | Jing et al. |
| 2017/0041359 A1 | 2/2017 | Kwan |
| 2017/0048615 A1 | 2/2017 | Son et al. |
| 2017/0061248 A1 | 3/2017 | Ryan, Jr. et al. |

(56) References Cited

U.S. PATENT DOCUMENTS

| | | | |
|---|---|---|---|
| 2017/0076720 A1 | 3/2017 | Gopalan et al. | |
| 2017/0083285 A1 | 3/2017 | Meyers et al. | |
| 2017/0084277 A1 | 3/2017 | Sharifi | |
| 2017/0133011 A1 | 5/2017 | Chen et al. | |
| 2017/0142533 A1 | 5/2017 | Park et al. | |
| 2017/0161278 A1 | 6/2017 | Carr et al. | |
| 2017/0186428 A1 | 6/2017 | Kunitake et al. | |
| 2017/0195815 A1* | 7/2017 | Christoph | H04S 7/303 |
| 2017/0206896 A1 | 7/2017 | Ko et al. | |
| 2017/0212723 A1 | 7/2017 | Atarot et al. | |
| 2017/0243576 A1 | 8/2017 | Millington et al. | |
| 2017/0245076 A1 | 8/2017 | Kusano et al. | |
| 2017/0269975 A1 | 9/2017 | Wood et al. | |
| 2017/0286049 A1 | 10/2017 | Kim et al. | |
| 2017/0289678 A1 | 10/2017 | Melanson et al. | |
| 2018/0014075 A1 | 1/2018 | Lewis et al. | |
| 2018/0025001 A1 | 1/2018 | Patel et al. | |
| 2018/0025733 A1 | 1/2018 | Qian et al. | |
| 2018/0033424 A1 | 2/2018 | Pechanec et al. | |
| 2018/0047394 A1* | 2/2018 | Tian | G10L 15/24 |
| 2018/0077233 A1 | 3/2018 | Chang et al. | |
| 2018/0077538 A1 | 3/2018 | Matus et al. | |
| 2018/0122373 A1 | 5/2018 | Gamer et al. | |
| 2018/0210703 A1 | 7/2018 | Meyers et al. | |
| 2018/0218234 A1* | 8/2018 | Engineer | G06V 20/635 |
| 2018/0253209 A1 | 9/2018 | Jaygarl et al. | |
| 2018/0286391 A1 | 10/2018 | Carey et al. | |
| 2018/0293484 A1 | 10/2018 | Wang et al. | |
| 2018/0330723 A1 | 11/2018 | Acero | |
| 2018/0349093 A1 | 12/2018 | McCarty et al. | |
| 2019/0013019 A1 | 1/2019 | Lawrence | |
| 2019/0018635 A1 | 1/2019 | Vassigh et al. | |
| 2019/0051305 A1 | 2/2019 | Liddell et al. | |
| 2019/0058942 A1 | 2/2019 | Garner et al. | |
| 2019/0066672 A1 | 2/2019 | Wood et al. | |
| 2019/0066673 A1 | 2/2019 | Wood et al. | |
| 2019/0066687 A1 | 2/2019 | Wood et al. | |
| 2019/0149584 A1 | 5/2019 | DiBello et al. | |
| 2019/0251960 A1 | 8/2019 | Maker et al. | |
| 2020/0086892 A1 | 3/2020 | Alequin | |
| 2020/0225896 A1 | 7/2020 | Vassigh et al. | |
| 2021/0304765 A1 | 9/2021 | Wood et al. | |
| 2021/0327433 A1 | 10/2021 | Wood et al. | |
| 2021/0383807 A1 | 12/2021 | Maker et al. | |
| 2023/0223024 A1 | 7/2023 | Wood et al. | |
| 2023/0252992 A1 | 8/2023 | Maker et al. | |
| 2024/0005926 A1 | 1/2024 | Wood et al. | |
| 2024/0031646 A1 | 1/2024 | Neerbek et al. | |

FOREIGN PATENT DOCUMENTS

| | | |
|---|---|---|
| KR | 20140023169 A | 2/2014 |
| WO | WO 2015/041892 A1 | 3/2015 |
| WO | WO 2016/032021 A1 | 3/2016 |
| WO | 2016057264 A1 | 4/2016 |
| WO | WO 2016/057268 A1 | 4/2016 |
| WO | WO 2016/094418 A1 | 6/2016 |

OTHER PUBLICATIONS

Supplementary European Search Report and Opinion for EP Application No. 19755020.5, mailed Oct. 14, 2021 (9 pages).
International Search Report and Written Opinion of the International Searching Authority for International Application No. PCT/US17/50629, mailed Sep. 27, 2017 (14 pages).
International Search Report and Written Opinion of the International Searching Authority for International Application No. PCT/US2018/041402, mailed Oct. 4, 2018 (6 pages).
International Search Report and Written Opinion of the International Searching Authority for International Application No. PCT/US2018/048104, mailed Dec. 17, 2018 (10 pages).
International Search Report and Written Opinion of the International Searching Authority for International Application No. PCT/US2018/048101, mailed Dec. 18, 2018 (14 pages).
International Search Report and Written Opinion of the International Searching Authority for International Application No. PCT/US2018/048106, mailed Jan. 16, 2019 (10 pages).
International Search Report and Written Opinion of the International Searching Authority for International Application No. PCT/US2018/000260, mailed Jan. 3, 2019 (14 pages).
Notification of the Transmittal of the International Search Report and the Written Opinion of the International Searching Authority directed to application No. PCT/US2019/017429, dated May 21, 2019, 10 pages.
Extended European Search Report for EP Application No. 17867227.5, European Patent Office, Munich, Germany, mailed on Feb. 24, 2020, 8 pages.
Extended European Search Report for EP Application No. 18852011.8, mailed Mar. 15, 2021, 8 pages.
Extended European Search Report for EP Application No. 18831837.2 mailed Mar. 9, 2021, 12 pages.
Extended European Search Report for EP Application No. 18849591.5 mailed Apr. 30, 2021, 11 pages.
Extended European Search Report for EP Application No. 18851376.6 mailed Apr. 30, 2021, 9 pages.
T. Kawahara, Chin-Hui Lee and Biing-Hwang Juang, "Flexible speech understanding based on combined key-phrase detection and verification," in IEEE Transactions on Speech and Audio Processing, vol. 6, No. 6, pp. 558-568, Nov. 1998, doi: 10.1109/89.725322. (Year: 1998).
P.-S. Huang, K. Kumar, C. Liu, Y. Gong and L. Deng, "Predicting speech recognition confidence using deep learning with word identity and score features," 2013 IEEE International Conference on Acoustics, Speech and Signal Processing, Vancouver, BC, Canada, 2013, pp. 7413-7417, ICASSP.2013. (Year: 2013).
International Search Report and Written Opinion of the International Searching Authority directed to related International Patent Application No. PCT/US2019/053992, mailed Jan. 29, 2020; 08 pages.
Partial Supplementary European Search Report for EP Application No. 18831837.2 mailed on Mar. 9, 2021, 14 pages.
Supplementary European Search Report directed to related European Application No. 19868969.7, mailed on May 19, 2022; 8 pages.

* cited by examiner

Library 188

| Index | Category | Type | Visual Indicator Command On-Off / Brightness / Color / Movement |
|---|---|---|---|
| 1 | Tone | Happy | All on / Medium/ Green / Slow movement right to left |
| 2 | Tone | Sad | Even on / Medium / Red / Slow blinking |
| 3 | Function/Scenario | Pause Playback | All on / Medium / Green / Slow movement right to left |
| 4 | Function/Scenario | Processing Command | All on / Medium / Blue / Medium blinking |
| 5 | Function/Scenario | Waiting for audio input | All off / NA / NA / NA |
| 6 | User Feedback | Audio input clearly understood | All on / Bright / Green / One long pulse |
| 7 | User Feedback | Audio input not received or understood | All on / Bright / Red / Fast blinking |
| N | | | |

FIG. 6

|  | Function | Command | Parameters |
|---|---|---|---|
| 926 | Bulk Audio Capture | Command 1 | Microphone, Time Period |
| 928 | Begin Audio Capture | Command 2 | Microphone |
| 930 | End Audio Capture | Command 3 |  |
| 932 | Audio Sample Rate | Command 4 |  |
| 934 | Audio Bit Depth | Command 5 |  |
|  | ⋮ |  |  |

920 — Function column
922 — Command column
Library (API) 904
924 — Parameters column

FIG. 9B

CONTROLLING VISUAL INDICATORS IN AN AUDIO RESPONSIVE ELECTRONIC DEVICE, AND CAPTURING AND PROVIDING AUDIO USING AN API, BY NATIVE AND NON-NATIVE COMPUTING DEVICES AND SERVICES

CROSS-REFERENCE TO RELATED APPLICATION

This application is a continuation of U.S. Non-provisional patent application Ser. No. 16/828,048, filed Mar. 24, 2020, now U.S. Pat. No. 11,126,389, which is a continuation of U.S. patent application Ser. No. 15/646,379, filed Jul. 11, 2017, now U.S. Pat. No. 10,599,377 both titled "Controlling Visual Indicators in an Audio Responsive Electronic Device, And Capturing and Providing Audio Using an API, By Native and Non-Native Computing Devices and Services," the contents of both are hereby incorporated herein by reference in its entirety.

FIELD

This disclosure is generally directed to providing visual feedback to a user when audibly interacting with computing devices.

BACKGROUND

Some electronic devices operate according to audio commands issued by human operators. But a number of factors may impede an electronic device's ability to receive and respond to audio commands. For example, the presence of noise may negatively impact an electronic device's ability to clearly receive and recognize an audio command, thereby preventing the electronic device from performing the command, or causing the electronic device to perform the incorrect command.

Typically, audio controlled electronic devices have a display or screen where visual feedback can be provided to users. For example, if a laptop computer (or tablet computer, smart phone, automobile navigation system, etc.) does not accurately receive a user's audible command, then the laptop computer can display to the user an appropriate written notification on the screen, such as "please say your command again." However, this approach works only if the audio controlled electronic device has a display. Some audio controlled electronic devices do not have a display. For example, some digital assistants (such as the AMAZON ECHO, for example) do not have a display.

A digital assistant typically includes a hardware front-end component and a software back-end component. Typically, the hardware component is local to the user, and the software component is in the Internet cloud. Often, in operation, the hardware component receives an audible command from the user, and provides the command to the software component. The software component processes the command and provides a response to the hardware component, for delivery to the user. For example, the user may say "What is the weather in Paris, France?" The hardware component transmits the query to the software component for processing. In response, the software component provides information indicating the current weather in Paris. Then, the hardware component audibly provides this weather information to the user. Examples of digital assistants (hardware/software) include: AMAZON ECHO/ALEXA, IPHONE/SIRI, MICROSOFT/CORTANA, and GOOGLE HOME/GOOGLE ASSISTANT.

Typically in digital assistants, the front end and back end are native to each other. That is, the hardware of the front end is designed specifically for the software of the back end, and vice versa. Because they are native and specific to each other, it is a relatively straightforward task to ensure the operation of the front end and back end are synchronized and operate properly with each other.

SUMMARY

Provided herein are system, apparatus, article of manufacture, method and/or computer program product embodiments, and/or combinations and sub-combinations thereof, for controlling a media device and/or a display device using audio commands. In so doing, some embodiments operate to suppress noise from the display device (or other sources of noise), and enhance audio commands from users (or other sources of audio commands).

While embodiments are described with respect to the example of controlling display devices and/or media devices in a media streaming environment, these embodiments are applicable to the audio control of any electronic devices and/or services in any environment.

Some embodiments operate by determining a position of the display device and de-enhancing audio from the display device based on the display device's position. The position of the user is determined, and audio from the user based on the user's position is enhanced. Then, a command in the enhanced user audio is identified, and the media device and/or the display device are caused to operate according to the command.

Also provided are system, apparatus, article of manufacture, method and/or computer program product embodiments, and/or combinations and sub-combinations thereof, for controlling visual indicators of an audio responsive electronic device. In some embodiments, an audio responsive electronic device operates by receiving audio input, and then analyzing the audio input to identify an intended target of the audio input. In some embodiments, the intended target is one of a plurality of electronic devices and/or services that are native or non-native to the audio responsive electronic device. The audio responsive electronic device transmits the audio input to the identified intended target. A reply message is received from the intended target. Then, the audio responsive electronic device controls its visual indicators using information in the reply message, to thereby provide visual feedback to a user. Control of the visual indicators is consistent, predictable and precise, irrespective of whether the electronic devices and/or services are native or non-native to the audio responsive electronic device.

Also provided are system, apparatus, article of manufacture, method and/or computer program product embodiments, and/or combinations and sub-combinations thereof, for capturing and providing audio to an application. In some embodiments, a media device receives a command from an application to capture audio, where the command conforms to an application programming interface of the media device. Responsive to the command, the media device captures audio from users and/or devices in proximity of the media device or another microphone-enabled device. The media device provides the captured audio to the application without any interpretation, transformation or translation. Thus, the captured, raw audio is not in a form useable by the application. In practice, the application may perform interpretation, transformation, translation, and/or other manipulation of the raw audio to convert it to a useable form.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings are incorporated herein and form a part of the specification.

FIG. 6 illustrates an example application programming interface (API) that includes a library of example commands for controlling or, more generally, enabling interaction with visual indicators of an audio responsive electronic device, according to some embodiments.

FIG. 9B illustrates an example library (or application programming interface) for audio capture, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
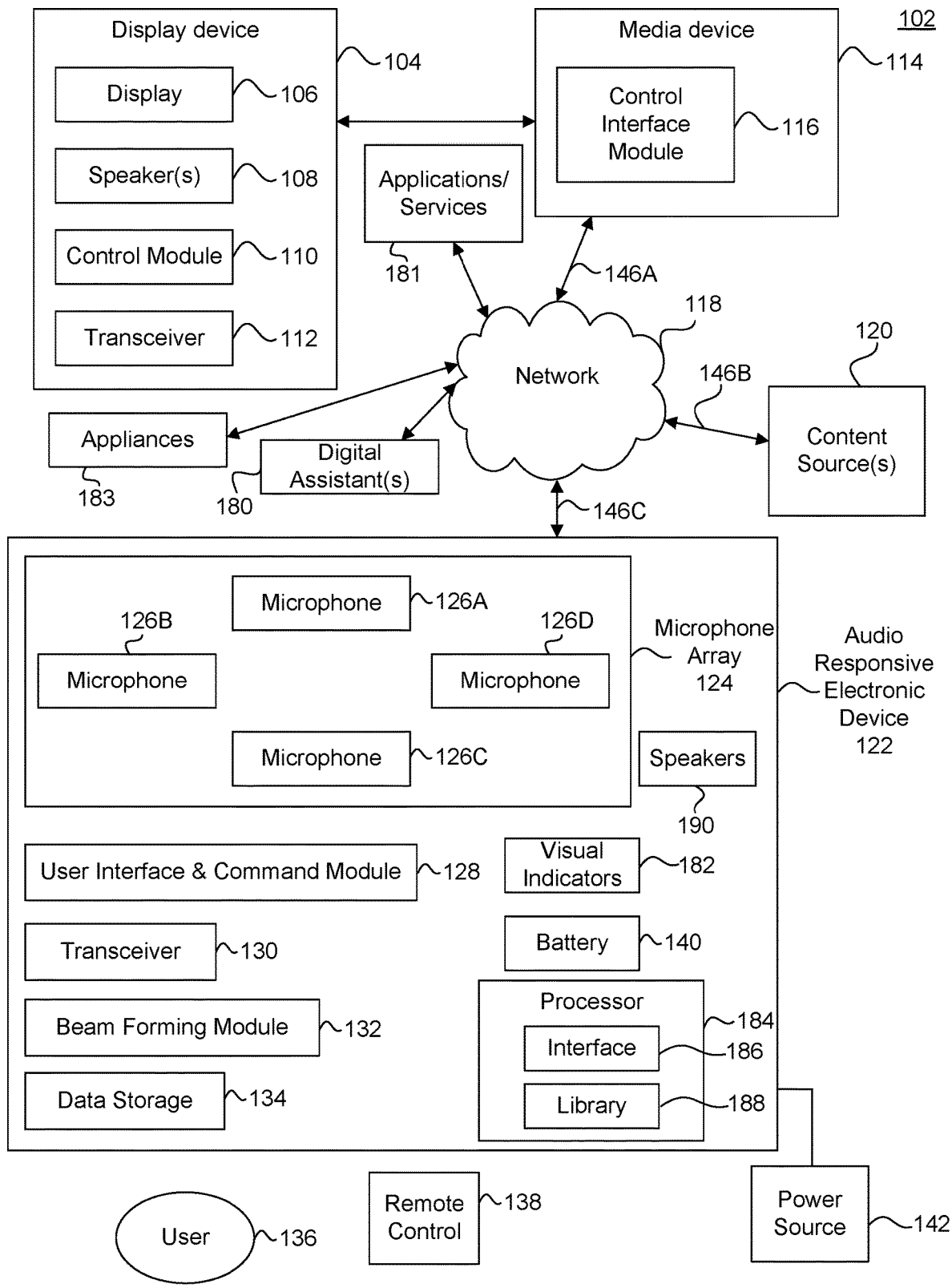
FIG. 1 illustrates a block diagram of a data processing system that includes an audio responsive electronic device, according to some embodiments.

FIG. 1 illustrates a block diagram of a data processing system 102, according to some embodiments. In a non-limiting example, data processing system 102 is a media or home electronics system 102.

The media system 102 may include a display device 104 (e.g. monitors, televisions, computers, phones, tablets, projectors, etc., or any other device having a display or screen) and a media device 114 (e.g. streaming devices, multimedia devices, audio/video playback devices, etc.). In some embodiments, the media device 114 can be a part of, integrated with, operatively coupled to, and/or connected to display device 104. The media device 114 can be configured to communicate with network 118. In various embodiments, the network 118 can include, without limitation, wired and/or wireless intranet, extranet, Internet, cellular, Bluetooth and/or any other local, short range, ad hoc, regional, global communications network, as well as any combination thereof.

The media system 102 also includes one or more content sources 120 (also called content servers 120). Content sources 120 may each store music, videos, movies, TV programs, multimedia, images, still pictures, text, graphics, gaming applications, advertisements, software, and/or any other content in electronic form.

The media system 102 may include a user 136 and a remote control 138. Remote control 138 can be any component, part, apparatus or method for controlling media device 114 and/or display device 104, such as a remote control, a tablet, laptop computer, smartphone, on-screen controls, integrated control buttons, or any combination thereof, to name just a few examples.

The media system 102 may also include an audio responsive electronic device 122. In some embodiments herein, the audio responsive electronic device 122 is an audio responsive remote control device. Audio remote control device 122 may receive audio commands (that is, spoken, voice, verbal or audible commands) from user 136 or another source of audio commands (such as but not limited to the audio of content output by speaker(s) 108 of display device 104). Audio remote control device 122 may convert or translate the received commands to signals, and then transmit the signals to media device 114, display device 104, digital assistant(s) 180, software applications and/or services 181, appliances 183, and/or any other component in system 102 (including any other device, service or app of the Internet of Things), to cause the media device 114, display device 104, digital assistant(s) 180, software applications and/or services 181, appliances 183, and/or other component to operate according to the received commands.

The display device 104 may include a display 106, speaker(s) 108, a control module 110 and transceiver 112. Control module 110 may receive and respond to commands from media device 114, remote control 138 and/or audio remote control 122 to control the operation of display device 104, such as selecting a source, varying audio and/or video properties, adjusting volume, powering on and off, to name just a few examples. Control module 110 may receive such commands via transceiver 112. Transceiver 112 may operate according to any communication standard or technique, such as infrared, cellular, WIFI, Blue Tooth, to name just a few examples.

Media device 114 may include a control interface module 116 for sending and receiving commands to/from display device 104, remote control 138 and/or audio remote control 122.

In operation, user 136 may use remote control 138 or audio remote control 122 to interact with media device 114 to select content, such as a movie, TV show or song. Media device 114 requests the selected content from content source(s) 120 over the network 118. Content source(s) 120 transmit the requested content to media device 114. Media device 114 transmits the content to display device 104 for playback using display 106 and/or speakers 108. User 136 may use remote control 138 or audio remote control 122 to change settings of display device 104, such as changing the volume, the source, the channel, display and audio settings, to name just a few examples.

In an embodiment, the user 136 may enter commands on remote control 138 by pressing buttons or using a touch screen on remote control 138, such as channel up/down, volume up/down, play/pause/stop/rewind/fast forward, menu, up, down, left, right, to name just a few examples.

In an embodiment, the user 136 may also or alternatively enter commands using audio remote control device 122 by speaking a command. For example, to increase the volume, the user 136 may say "Volume Up." To change to the immediately preceding channel, the user 136 may say "Channel down." In an embodiment, the user 136 may be required to say a trigger word before saying commands, to better enable the audio remote control 122 to distinguish between commands and other spoken words. For example, the trigger word may be "Command." In this case, to increase the volume, the user 136 may say "Command Volume Up." In an embodiment, there may be one or more trigger words that are recognized by audio remote control device 122.

In some embodiments, the audio remote control 122 may include a microphone array 124 comprising one or more microphones 126. The audio remote control 122 may also include a user interface and command module 128, transceiver 130, beam forming module 132 and data storage 134. The audio remote control 122 may further include visual indicators 182, speakers 190, and a processor or processing module 184 having an interface 186 and database library 188, according to some embodiments (further described below). In some embodiments, the library 188 may be stored in data storage 134.

User interface and command module 128 may receive audio input via microphone array 124. The audio input may be from user 136, display device 104 (via speakers 108), or any other audio source in system 102. User interface and command module 128 may analyze the received audio input to recognize trigger words and commands, using any well-known signal recognition techniques, procedures, technologies, etc. The user interface and command module 128 may generate command signals compatible with display device 104 and/or media device 114 corresponding to the recognized commands, and transmit such commands to display device 104 and/or media device 114 via transceiver 130, to thereby cause display device 104 and/or media device 114 to operate according to the commands. Transceiver 130 may operate according to any communication standard or technique, such as infrared, cellular, WIFI, Blue Tooth, to name just a few examples. Audio remote control device 122 may be powered by a battery 140, or via an external power source 142 (such as AC power, for example).

Figure 2:
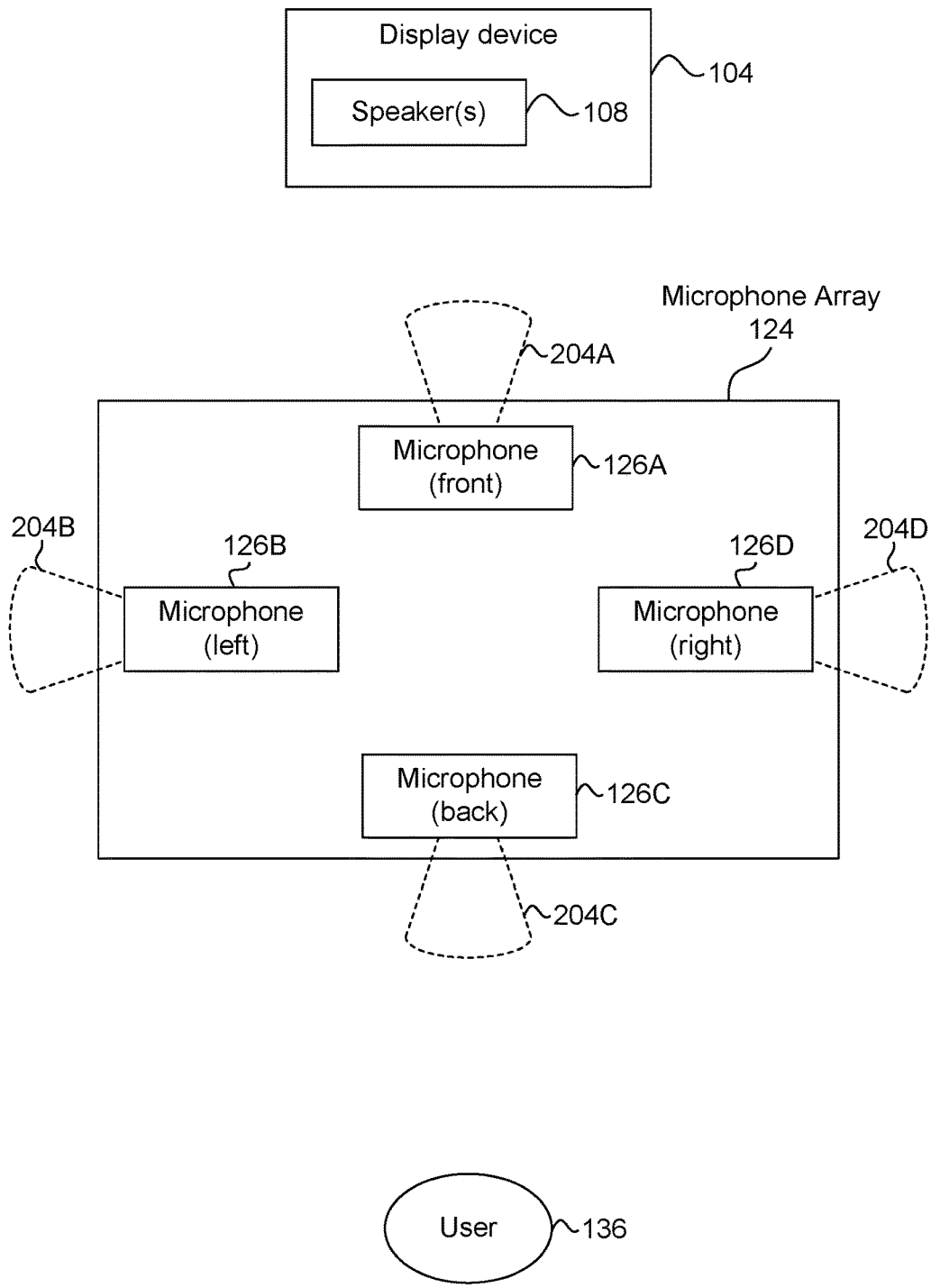
FIG. 2 illustrates a block diagram of a microphone array having a plurality of microphones, shown oriented relative to a display device and a user, according to some embodiments.

FIG. 2 illustrates a block diagram of microphone array 124 of the audio remote control device 122, shown in an example orientation relative to the display device 104 and the user 136, according to some embodiments. In the example of FIG. 2, the microphone array 124 includes four microphones 126A-126D, although in other embodiments the microphone array 124 may include any number of microphones 126.

In the example of FIG. 2, microphones 126 are positioned relative to each other in a general square configuration. For illustrative purposes, and not limiting, microphone 126A may be considered at the front; microphone 126D may be considered at the right; microphone 126C may be considered at the back; and microphone 126B may be considered at the left. It is noted that such example designations may be set according to an expected or designated position of user 136 or display device 104, in some embodiments.

As shown in the example of FIG. 2, the user 136 is positioned proximate to the back microphone 126C, and the display device 104 is positioned proximate to the front microphone 126A.

Each microphone 126 may have an associated reception pattern 204. As will be appreciated by persons skilled in the relevant art(s), a microphone's reception pattern reflects the directionality of the microphone, that is, the microphone's sensitivity to sound from various directions. As persons skilled in the relevant art(s) will appreciate, some microphones pick up sound equally from all directions, others pick up sound only from one direction or a particular combination of directions.

In the example orientation of FIG. 2, the front microphone 126A receives audio from speakers 108 of display 104 most clearly, given its reception pattern 204A and relative to the other microphones 204B-204D. The back microphone 126C receives audio from user 136 most clearly, given its reception pattern 204C and relative to the other microphones 126A, 126B and 126D.

Figure 3:
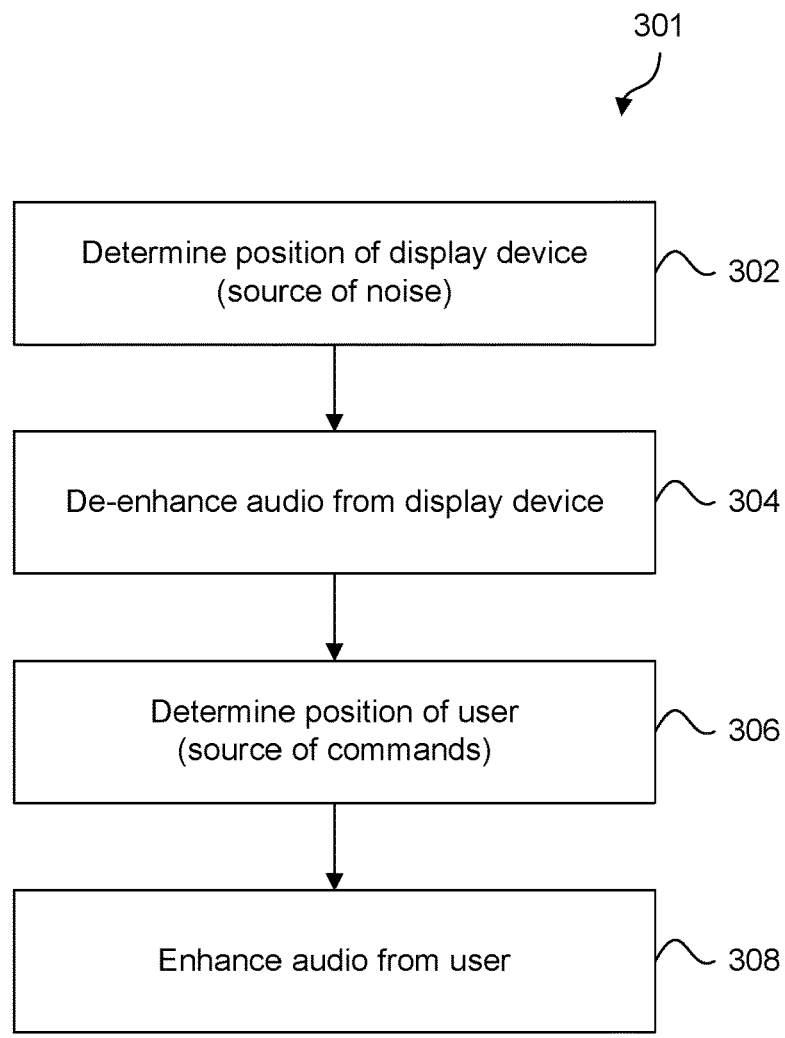
FIG. 3 illustrates a method for enhancing audio from a user and de-enhancing audio from a display device and/or other noise sources, according to some embodiments.

FIG. 3 illustrates a method 301 for enhancing audio from a user (and/or other sources of audio commands) and de-enhancing audio from a display device (and/or other noise sources), according to some embodiments. Method 301 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 301 shall be described with reference to FIGS. 1 and 2. However, method 301 is not limited to those examples.

In 302, the position of a source of noise may be determined. For example, user interface and command module 128 of the audio remote control device 122 may determine the position of display device 104. In embodiments, display device 104 may be considered a source of noise because audio commands may be expected from user 136 during times when display device 104 is outputting audio of content via speakers 108.

In an embodiment, user 136 may enter configuration settings specifying where the display device 104 is positioned proximate to one of the microphones 126 (such as the front microphone 126A in the example orientation of FIG. 2). Such configuration settings may be stored in data storage 134 of the audio remote control device 122. Accordingly, in 302, user interface and command module 128 may access the configuration settings in data storage 134 to determine the position of display device 104.

In 304, audio from the source of noise may be de-enhanced or suppressed. For example, user interface and command module 128 may deactivate microphones 126 proximate to the display device 104 and having reception patterns 204 most likely to receive audio from display device 104. Specifically, in the example of FIG. 2, user interface and command module 128 may deactivate the front microphone 126A, and potentially also the right microphone 126D and/or the left microphone 126B.

Alternatively or additionally, beam forming module 132 in the audio remote control device 122 may use beam forming techniques on any of its microphones 126 to de-emphasize reception of audio from the display device 104. For example, beam forming module 132 may adjust the reception pattern 204A of the front microphone 126A (and potentially also reception patterns 204D and 204B of the right microphone 126D and the left microphone 126) to suppress or even negate the receipt of audio from display device 104. Beam forming module 132 may perform this functionality using any well-known beam forming technique, operation, process, module, apparatus, technology, etc.

Alternatively or additionally, user interface and command module 128 may issue a command via transceiver 130 to display device 104 to mute display device 104. In some embodiments, user interface and command module 128 may mute display device 104 after receiving and recognizing a trigger word. The user interface and command module 128 may operate in this manner, since user interface and command module 128 expects to receive one or more commands from user 136 after receiving a trigger word.

Figure 4:
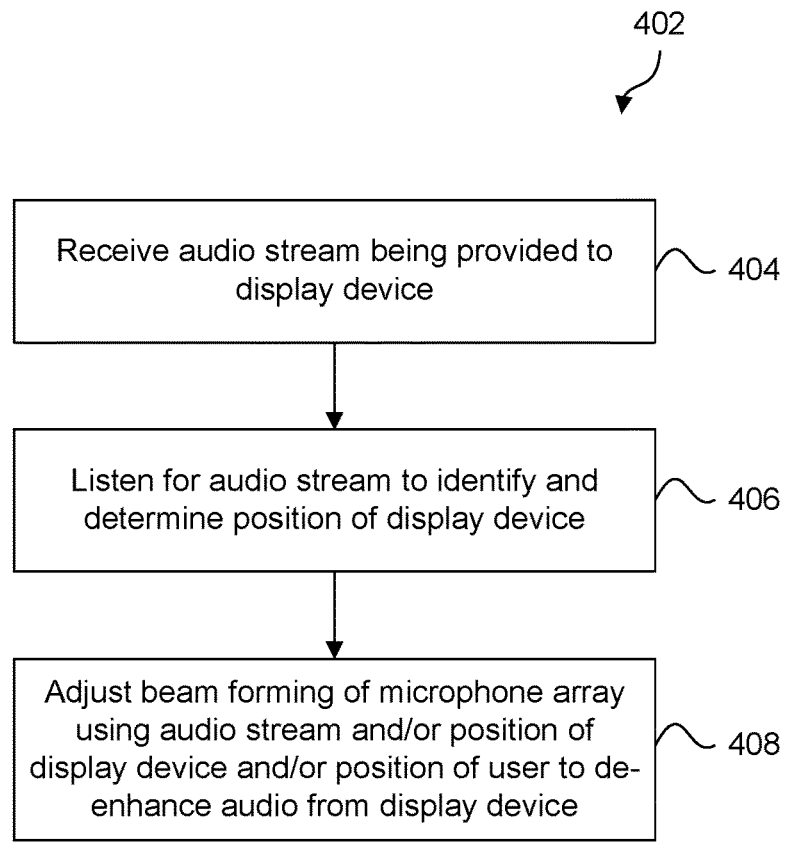
FIG. 4 illustrates a method for de-enhancing audio from a display device and/or other noise sources, according to some embodiments.

FIG. 4 illustrates an alternative or additional embodiment for implementing elements 302 and 304 in FIG. 3. In 404, user interface and command module 128 in the audio remote control device 122 receives the audio stream of content being also provided to display device 104 from media device 114, for play over speakers 108. User interface and command module 128 may receive this audio stream from media device 114 via network 118 using, for example, WIFI, Blue Tooth, cellular, to name a few communication examples. User interface and command module 128 could also receive this audio stream from content source(s) 120 over network 118.

In 406, user interface and command module 128 may listen for audio received via microphone array 124 that matches the audio stream received in 404, using well-known signal processing techniques and algorithms.

In 408, user interface and command module 128 may adjust the reception patterns 204 of those microphones 126 that received the matched audio stream, to suppress or even null audio reception of those microphones 126. For example, in 408, user interface and command module 128 may identify the microphones 126 where the signal amplitude (or signal strength) was the greatest during reception of the matched audio stream (such as the front microphone 126A in the example orientation of FIG. 2), and then operate with beam forming module 132 to suppress or null audio reception of those microphones 126 using well-known beam forming techniques.

Alternatively or additionally, user interface and command module 128 in 408 may subtract the matched audio received in 406 from the combined audio received from all the microphones 126 in microphone array 124, to compensate for noise from the display device 104.

In some embodiments, the operations depicted in flowchart 402 are not performed when audio remote control device 122 is powered by the battery 140 because receipt of the audio stream in 404 may consume significant power, particularly if receipt is via WIFI or cellular. Instead, in these embodiments, flowchart 402 is performed when audio remote control device 122 is powered by an external source 142.

Referring back to FIG. 3, in 306, the position of a source of commands may be determined. For example, in some embodiments, user interface and command module 128 of the audio remote control device 122 may determine the position of user 136, since user 136 may be considered to be the source of commands.

In an embodiment, user 136 may enter configuration settings specifying the user 136 is the source of commands, and is positioned proximate to one of the microphones 126 (such as the back microphone 126C in the example orientation of FIG. 2). Accordingly, in 306, user interface and command module 128 may access the configuration settings in data storage 134 to determine the position of user 136.

In 308, audio from the source of commands may be enhanced. For example, user interface and command module 128 may enhance the audio sensitivity of microphones 126 proximate to the user 136 and having reception patterns 204 most likely to receive audio from user 136, using beam forming techniques. With regard to the example of FIG. 2, the user interface and command module 128 may use well-known beam forming techniques to adjust the reception pattern 204C of back microphone 126C to enhance the ability of back microphone 126C to clearly receive audio from user 136.

Figure 5:
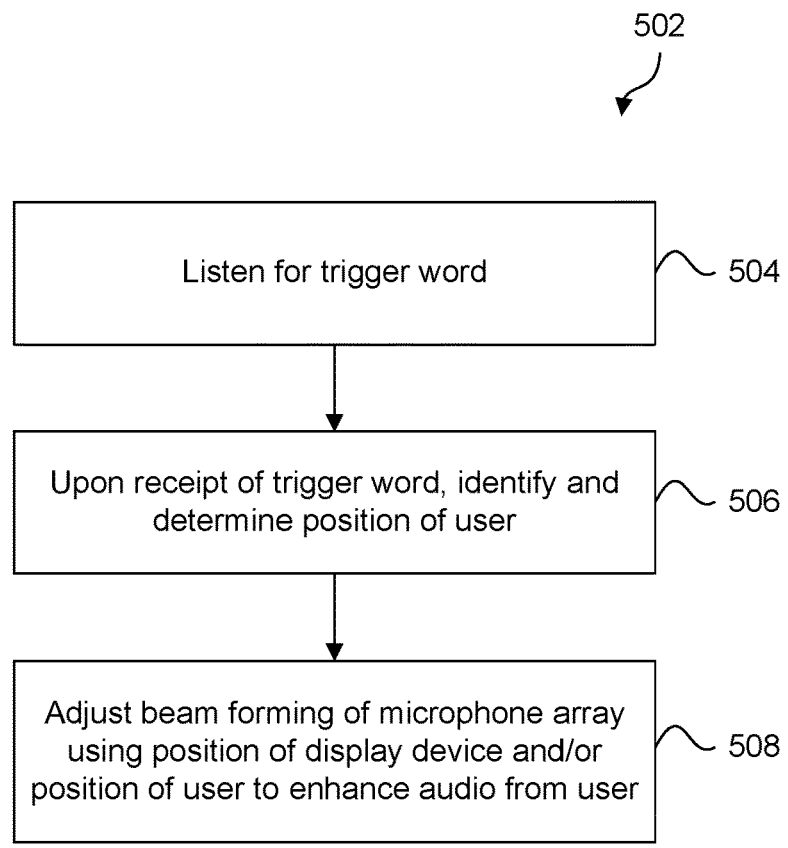
FIG. 5 illustrates a method for enhancing audio from a user, according to some embodiments.

FIG. 5 illustrates a method 502 for enhancing audio from a user, according to some embodiments. In some embodiments, method 502 is an alternative implementation of elements 306 and/or 308 in FIG. 3.

In 504, the user interface and command module 128 in the audio remote control device 122 receives audio via microphone array 124, and uses well know speech recognition technology to listen for any predefined trigger word.

In 506, upon receipt of a trigger word, user interface and command module 128 determines the position of the user 136. For example, in 506, user interface and command module 128 may identify the microphones 126 where the signal amplitude (or signal strength) was the greatest during reception of the trigger word(s) (such as the back microphone 126C in the example of FIG. 2), and then operate with beam forming module 132 to adjust the reception patterns 126 of the identified microphones 126 (such as reception pattern 126C of the back microphone 126C) to enhance audio sensitivity and reception by those microphones 126. In this way, user interface and command module 128 may be able to better receive audio from user 136, to thus be able to better recognize commands in the received audio. Beam forming module 132 may perform this functionality using any well-known beam forming technique, operation, process, module, apparatus, technology, etc.

In embodiments, trigger words and commands may be issued by any audio source. For example, trigger words and commands may be part of the audio track of content such that the speakers 108 of display device 104 may audibly output trigger words and audio commands as the content (received from media device 114) is played on the display device 104. In an embodiment, such audio commands may cause the media device 114 to retrieve related content from content sources 120, for playback or otherwise presentation via display device 104. In these embodiments, audio remote control device 122 may detect and recognize such trigger words and audio commands in the manner described above with respect to FIGS. 3-5, except in this case the display device 104 is the source of the commands, and the user 136 is a source of noise. Accordingly, with respect to FIG. 3, elements 302 and 304 are performed with respect to the user 136 (since in this example the user 136 is the source of noise), and elements 306 and 308 are performed with respect to the display device 104 (since in this example the display device 104 is the source of audio commands).

In some embodiments, different trigger words may be used to identify the source of commands. For example, the trigger word may be "Command" if the source of commands is the user 136. The trigger word may be "System" if the source of the commands is the display device 104 (or alternatively the trigger word may be a sound or sequence of sounds not audible to humans if the source of the commands is the display device 104). In this manner, the audio remote control device 122 is able to determine which audio source to de-enhance, and which audio source to enhance. For example, if the audio remote control device 122 determines the detected trigger word corresponds to the display device 104 (such that the display device 104 is the source of audio commands), then the audio remote control device 122 may operate in 302 and 304 of FIG. 3 to de-enhance audio from user 136, and operate in 306 and 308 of FIG. 3 to enhance audio from the display device 104.

In embodiments, the beam forming algorithms executed by the beam forming module 132 can be simplified because the display device 104 and the user 136 are typically at stable locations relative to the audio remote control device 122. That is, once initially positioned, the display device 104 and the audio remote control device 122 are typically not moved, or are moved by small amounts. Also, users 136 tend to watch the display device 104 from the same locations, so their locations relative to the audio remote control device 122 are also often stable.

Providing Visual Indicators from Computing
Entities/Devices That are Non-Native to an Audio
Responsive Electronic Device As noted above, in some embodiments, the audio responsive electronic device 122 may communicate and operate with any combination of media device 114, display device 104, digital assistant(s) 180, software applications and/or services 181, appliances 183, and/or any other component in system 102 (including any other device, service or app of the Internet of Things) via the network 118. For illustrative purposes, the following describes the operation of the audio responsive electronic device 122 with digital assistants 180. However, this disclosure is not so limited. Persons skilled in the relevant art(s) will appreciate that the embodiments described herein are applicable to any media device, display device, digital assistants, software applications and/or services, appliances, and/or any other component (including any other device, service or app of the Internet of Things) connected to the network 118.

A digital assistant may include a hardware front-end component and a software back-end component. The hardware component may be local to the user (located in the same room, for example), and the software component may be in the Internet cloud. Often, in operation, the hardware component receives an audible command from the user, and provides the command to the software component over a network, such as the Internet. The software component processes the command and provides a response to the hardware component, for delivery to the user (for example, the hardware component may audibly play the response to the user). In some embodiments, the digital assistants 180 shown in FIG. 1 represent the software back-end; examples include but are not limited to AMAZON ALEXA, SIRI, CORTANA, GOOGLE ASSISTANT, etc. In some embodiments, the audio responsive electronic device 122 represents the hardware front-end component. Thus, in some embodiments, the audio responsive electronic device 122 takes the place of AMAZON ECHO when operating with ALEXA, or the IPHONE when operating with SIRI, or GOOGLE HOME when operating with the GOOGLE ASSISTANT, etc.

As discussed above, AMAZON ECHO is native to ALEXA. That is, AMAZON ECHO was designed and implemented specifically for ALEXA, with knowledge of its internal structure and operation, and vice versa. Similarly, the IPHONE is native to SIRI, MICROSOFT computers are native to CORTANA, and GOOGLE HOME is native to GOOGLE ASSISTANT. Because they are native to each other, the back-end software component is able to control and cause the front-end hardware component to operate in a consistent, predictable and precise manner, because the back-end software component was implemented and operates with knowledge of the design and implementation of the front-end hardware component.

In contrast, in some embodiments, the audio responsive electronic device 122 is not native to one or more of the digital assistants 180. There is a technological challenge when hardware (such as the audio responsive electronic device 122) is being controlled by non-native software (such as digital assistants 180). The challenge results from the hardware being partially or completely a closed system from the point of view of the software. Because specifics of the hardware are not known, it is difficult or even impossible for the non-native software to control the hardware in predictable and precise ways.

Consider, for example, visual indicators 182 in the audio responsive electronic device 122. In some embodiments, visual indicators 182 are a series of light emitting diodes (LEDs), such as 5 diodes (although the visual indicators 182 can include more or less than 5 diodes). Digital assistants 180 may wish to use visual indicators 182 to provide visual feedback to (and otherwise visually communicate with) the user 136. However, because they are non-native, digital assistants 180 may not have sufficient knowledge of the technical implementation of the audio responsive electronic device 122 to enable control of the visual indicators 182 in a predictable and precise manner.

Some embodiments of this disclosure solve this technological challenge by providing a processor or processing module 184, and an interface 186 and a library 188. An example library 188 is shown in FIG. 6. In some embodiments, the library 188 and/or interface 186 represent an application programming interface (API) having commands for controlling the visual indicators 182. Native and non-native electronic devices and/or software services, such as digital assistants 180, media device 114, content sources 120, display device 104, applications/services 181, appliances 183, etc., may use the API of the library 188 to interact with and/or control the audio responsive electronic device 122 in a consistent, predictable and precise manner.

Additionally or alternatively, native and non-native electronic devices and/or software services may use the API of the library 188 to supply the audio responsive electronic device 122 with information about their response, status, condition, etc. In some embodiments, the audio responsive electronic device 122 may use that information to provide visual and/or other feedback to users 136. More particularly, electronic devices and/or software services—particularly if they are non-native to the audio responsive electronic device 122—may have no knowledge of the design, implementation, capabilities or operation of the audio responsive electronic device 122, particularly regarding the way the audio responsive electronic device 122 provides feedback to users. But through use of the interface 186 and library 188, electronic devices and/or software services can provide information about their responses to the audio responsive electronic device 122. Then, the audio responsive electronic device 122 can use and interpret that information to provide feedback to users pertaining to the responses from the electronic devices and/or software services.

In some embodiments, the library 188 may have a row 610 for each command supported by the API. Each row 610 may include information specifying an index 604, category 606, type (or sub-category) 608, and/or visual indicator command 610. The index 604 may be an identifier of the API command associated with the respective row 610. The category 606 may specify the category of the API command. In some embodiments, there may be three categories of API commands: tone, function/scenario and user feedback. However, other embodiments may include more, less and/or different categories.

The tone category may correspond to an emotional state that a digital assistant 180 may wish to convey when sending a message to the user 136 via the audio responsive electronic device 122. The example library 188 of FIG. 6 illustrates 2 rows 610A, 610B of the tone category. The emotional state may be designated in the type field 608. According, row 610A corresponds to a "happy" emotional state, and row 610B corresponds to a "sad" emotional state. Other embodiments may include any number of tone rows corresponding to any emotions.

The function/scenario category may correspond to functions and/or scenarios wherein a digital assistant 180 may wish to convey visual feedback to the user 136 via the audio responsive electronic device 122. The example library 188 of FIG. 6 illustrates 3 rows 610C, 610D, 610E of the function/scenario category. The function/scenario may be designated in the type field 608. According, row 610C corresponds to a situation where the audio responsive electronic device 122 is pausing playback, row 610D corresponds to a situation where the audio responsive electronic device 122 is processing a command, and row 610E corresponds to a situation where the audio responsive electronic device 122 is waiting for audio input. Other embodiments may include any number of function/scenario rows corresponding to any functions and/or scenarios.

The user feedback category may correspond to situations where a digital assistant 180 or the audio responsive electronic device 122 may wish to provide feedback or information (or otherwise communicate with) the user 136. The example library 188 of FIG. 6 illustrates 2 rows 610F, 610G of the user feedback category. The user feedback situation may be designated in the type field 608. According, row 610F corresponds to a situation where a digital assistant 180 or the audio responsive electronic device 122 wishes to inform the user 136 that audio input was clearly understood. Row 610G corresponds to a situation where a digital assistant 180 or the audio responsive electronic device 122 wishes to inform the user 136 that audio input was not received or understood. Other embodiments may include any number of user feedback rows corresponding to any user feedback messages.

The library 188 may specify how the audio responsive electronic device 122 operates for the commands respectively associated with the rows 610. For example, information in the visual indicator command 610 field may specify how the visual indicators 182 in the audio responsive electronic device 122 operate for the commands respectively associated with the rows 610. While the following describes operation of the visual indicators 182, in other embodiments the library 188 may specify how other functions and/or features of the audio responsive electronic device 122 operate for the commands respectively associated with the rows 610.

In some embodiments, the visual indicator field 610 indicates: which LEDs of the visual indicators 182 are on or off; the brightness of the "on" LEDs; the color of the "on" LEDs; and/or the movement of light of the LEDs (for example, whether the "on" LEDs are blinking, flashing from one side to the other, etc.). For example, for row 610A, corresponding to the "happy" tone, all the LEDs are on with medium brightness, the color is green, and the LEDs are turned on to simulate slow movement from right to left. For row 610D, corresponding to the "processing command" function/scenario, all the LEDs are on with medium brightness, the color is blue, and the LEDs are blinking at medium speed. For row 610E, corresponding to the "waiting for audio input" function/scenario, all the LEDs are off. For row 610G, corresponding to the "audio input not received or understood" user feedback category, all the LEDs are on with high brightness, the color is red, and the LEDs are blinking at high speed. These settings in the visual indicator command field 610 are provided for illustrative purposes only and are not limiting. These settings in the visual indicator command field 610 can be any user-defined settings.

Figure 7:
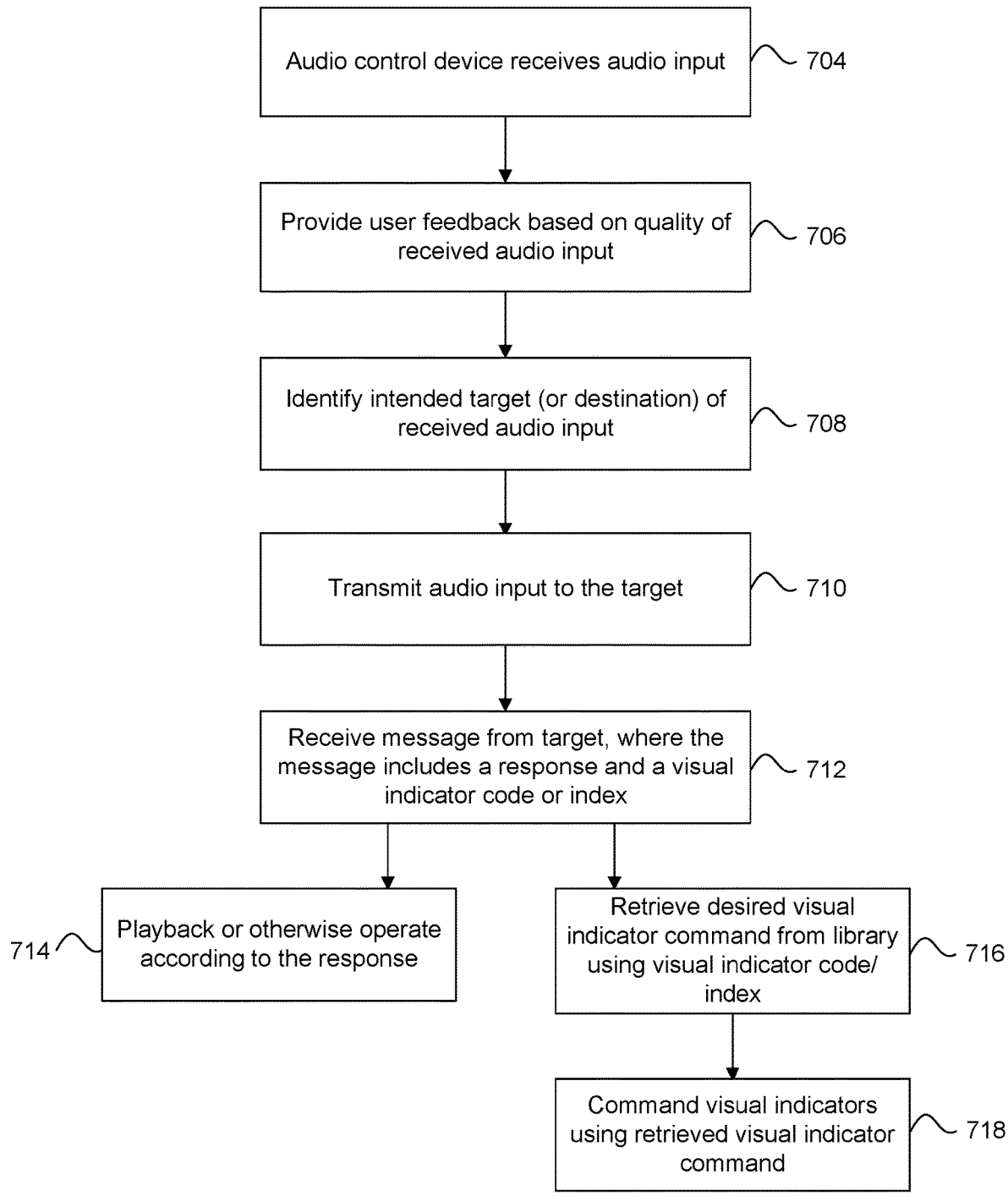
FIG. 7 illustrates a method in an audio responsive electronic device for providing to users visual indicators from computing entities/devices that are non-native to the audio responsive electronic device, according to some embodiments.

FIG. 7 illustrates a method 702 in the audio responsive electronic device 122 for predictably and precisely providing users 136 with visual information from computing entities/devices/services/apps, such as but not limited to media device 114, display device 104, digital assistant(s) 180, software applications and/or services 181, appliances 183, and/or any other component in system 102 (including any other device, service or app of the Internet of Things), Such computing entities/devices/services/apps may be native or non-native to the audio responsive electronic device 122. Accordingly, embodiments of this disclosure overcome the technical challenge of enabling a first computing device/service/app to predictably and precisely interact with and control a second computing device/service/app, when the first computer device service/app is not native to the second computing device service/app.

It is noted that while visual feedback is discussed herein, this disclosure is not limited to that example embodiment. Instead, the feedback provided to users by the audio responsive electronic device 122 may be in any form, such as audible, tactile, vibration, etc., in addition to or instead of visual feedback.

Method 702 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

For illustrative and non-limiting purposes, method 702 shall be described with reference to FIGS. 1 and 6. However, method 702 is not limited to those examples.

In 704, the audio responsive electronic device 122 receives audio input from user 136 or another source, such as from speakers 108 of display device 106. The microphone array 124 of the audio responsive electronic device 122 receives such audio input. For example, user 136 may say "When does the new season of GAME OF THRONES start?"

In 706, the audio responsive electronic device 122 determines if the audio input was properly received and understood. The audio input may not have been properly received if the user 136 was speaking in a low voice, if there was noise from other sources (such as from other users or the display device 104), or any number of other reasons. The audio responsive electronic device 122 may use well-known speech recognition technology to assist in determining whether the audio input was properly received and understood in step 706.

In some embodiments, in step 706, the audio responsive electronic device 122 may use the library 188 to provide visual feedback to the user 136 as to whether the audio input was properly received and understood. For example, the audio responsive electronic device 122 may send index 6 to the interface 186 of processor 184 when the audio input was properly received and understood. Processor 184 may access the library 188 using Index 6 to retrieve the information from row 610F, which corresponds to the "audio input clearly understood" user feedback command. The processor 184 may use the visual indicator command field 610 of the retrieved row 610F to cause the LEDs of the visual indicators 182 to be one long bright green pulse.

As another example, the audio responsive electronic device 122 may send Index 7 to the interface 186 of processor 184 when the audio input was not properly received and understood. Processor 184 may access the library 188 using Index 7 to retrieve the information from row 610G, which corresponds to the "audio input not received or understood" user feedback command. The processor 184 may use the visual indicator command field 610 of the retrieved row 610G to cause the LEDs of the visual indicators 182 to be all on, bright red, and fast blinking.

If, in 706, the audio responsive electronic device 122 determined the audio input was properly received and understood, then in 708 the audio responsive electronic device 122 analyzes the audio input to identify the intended target (or destination) of the audio input. For example, the audio responsive electronic device 122 may analyze the audio input to identify keywords or trigger words in the audio input, such as "HEY SIRI" (indicating the intended target is SIRI), "HEY GOOGLE" (indicating the intended target is the GOOGLE ASSISTANT), or "HEY ROKU" (indicating the intended target is the media device 114).

In 710, the audio responsive electronic device 122 transmits the audio input to the intended target identified in 708, via the network 118. For example, the audio responsive electronic device 122 may transmit the audio input to one of the digital assistants 180 via the network 118. The intended target processes the audio input and sends a reply message to the audio responsive electronic device 122 over the network. In some embodiments, the reply message may include (1) a response, and (2) a visual indicator index.

For example, assume the intended target is SIRI and the audio input from step 704 is "When does the new season of GAME OF THRONES start?" If SIRI is not able to find an answer to the query, then the reply message from SIRI may be:

(1) Response: "I don't know"
(2) Visual Indicator Index: 2

If SIRI is able to find an answer to the query, then the reply message from SIRI may be:

(1) Response: "Soon"
(2) Visual Indicator Index: 1

In 714, the audio responsive electronic device 122 processes the response received in step 712. The response may be a message to audibly playback to the user 136 via speakers 190, or may be commands that the audio responsive electronic device 122 is instructed to perform (such as commands to control the media device 114, the display device 104, etc.).

In the above examples, the audio responsive electronic device 122 may play over speakers 190 "I don't know" or "Soon."

Steps 716 and 718 are performed at the same time as step 714, in some embodiments. In 716, the interface 186 of the audio responsive electronic device 122 uses the visual indicator index (received in 712) to access and retrieved information from a row 610 in the library 188. The processor 184 or interface 186 uses information in the visual indicator command field 610 of the retrieved row 610 to configure the visual indicators 182.

In the above examples, when the received response is "I don't know" and the received visual indicator index is 2, the processor 184 or interface 186 causes every other LED of the visual indicators 182 to be on, red with medium intensity, slowly blinking. When the received response is "Soon" and the received visual indicator index is 1, the processor 184 or interface 186 causes all the LEDs of the visual indicators 182 to be on, green with medium intensity, configured to simulate slow movement from right to left.

The above operation of the audio responsive electronic device 122, and the control and operation of the visual indicators 182, referenced SIRI as the intended digital assistant 180 for illustrative purposes only. It should be understood, however, that the audio responsive electronic device 122 and the visual indicators 182 would operate in the same predictable and precise way for any other digital assistant 180, display device 104, media device 114, etc., whether native or non-native to the audio responsive electronic device 122.

Providing Raw, Unprocessed Audio Data to
Applications and Devices Requesting Same
According to an Application Programming Interface
(API)

Some embodiments of this disclosure enable applications to obtain audio data (that is, spoken, voice, verbal or audible data) from users or devices, where such applications do not have microphones (that is, are not microphone enabled) and/or are not located within close proximity of the users or devices to directly capture their audio. For example, referring to FIG. 1, some embodiments of this disclosure enable digital assistant(s) 180, software applications and/or services 181, appliances 183, content sources 120, and/or any other component or application connected to network 118 (including any other device, service or app of the Internet of Things) to obtain audio data from user 136, or from any other source of audio in system 102 (such as from speakers 108 of display device 104).

Figure 8:
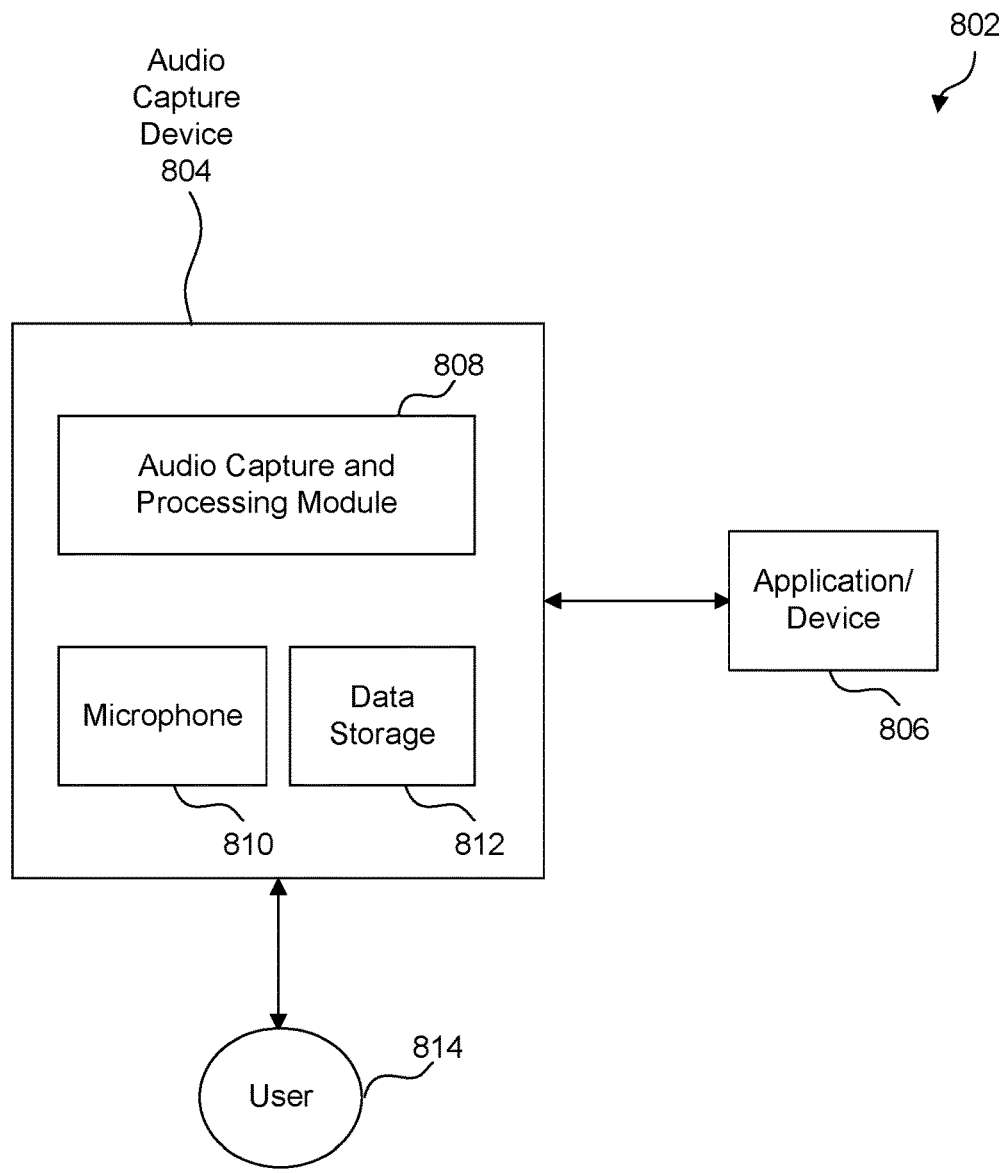
FIG. 8 illustrates a conventional audio capture device that captures and processes audio data, and then provides the processed audio data to an application or device.

FIG. 8 illustrates a conventional audio capture device 804 that includes an audio capture and processing module 808, a microphone 810 and data storage 812. The audio capture device 804 is in sufficiently close proximity to user 814 to capture the user 814's spoken voice (for example, the audio capture device 804 may be in the same room as user 814). In operation, an application or device 806 transmits a request for audio from user 814 to the audio capture device 804. In response, the audio capture and processing module 808 captures audio from user 814 using microphone 810. For purposes of illustration, it is assumed that the audio is sampled and captured using pulse code modulation (PCM) techniques.

The captured PCM audio is stored in data storage 812. It is noted that, at this point, the captured PCM audio has not been processed by the audio capture device 804. That is, the captured PCM audio data is raw and unprocessed. Such raw and unprocessed audio data may not be in a form useable by the application/device 806. Accordingly, in conventional approaches, the audio capture and processing module 808 of the audio capture device 804 processes the raw audio data so that it is in a form useable by the application/device 806. As will be appreciated by persons skilled in the relevant art(s), such processing may include any interpretation, transformation, translation, manipulation and/or other processing of the raw audio data to transform the raw audio to a form useable by the application/device 806. Then, the audio capture device 804 transmits the processed, useable audio data to the application/device 806. The application/device 806 uses the received processed audio in application specific ways (for example, as input to voice memos or reminders, as voice commands, as biometric passcodes, etc.).

As will be appreciated by persons skilled in the relevant art(s), there may be legal privacy concerns with capturing voice data from users 814. Such legal privacy concerns may apply to the application/device 806 (and the entities who own, control or sell application/device 806), because the application/device 806 has accessed to the processed voice data, and is using the processed voice data in some application specific ways. Such legal privacy concerns may also apply to the audio capture device 804 (and the entities who own, control or sell audio capture device 804), because the audio capture device 804 has processed the raw audio data so that it is useable by application/device 806. This may be the case, even though the audio capture device 804 only generates the processed audio data from the raw audio data, and does not otherwise use the processed audio data (other than providing the processed audio data to the application/device 806).

Figure 9A:
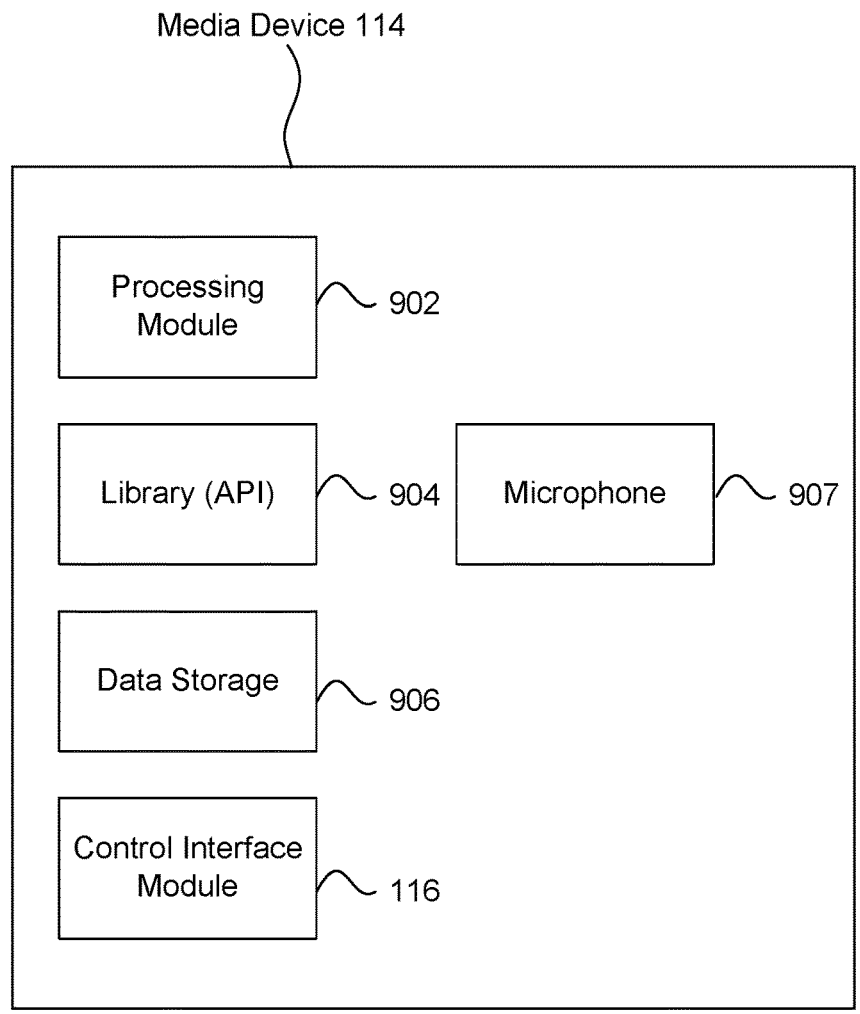
FIG. 9A illustrates a media device having a library (or application programming interface) for audio capture, according to some embodiments.

FIG. 9A illustrates additional details of the media device 114 of FIG. 1, according to some embodiments. Media device 114 may be configured to capture audio from users 136 (or from other audio sources, such as display device 104). However, in contrast to conventional approaches (as shown in FIG. 8, for example), media device 114 operates so as to reduce or even eliminate the legal privacy concerns as to itself (as well as the legal privacy concerns of entities who own, control or sell media device 114) relating to such voice capture.

In some embodiments, the media device 114 may include a control interface module 116, processing module 902, library 904, data storage 906 and microphone 907. The library 904 may represent an application programming interface (API) to enable applications and devices to access its features and functionalities, including capturing voice data from users 136 and other devices (such as display device 104). Library 904 may be part of or separate from library 188 shown in FIG. 6. For example, library 904 may be part library 188 when the audio capture features discussed herein are performed by the audio responsive electronic device 122 rather than the media device 114. In fact, the audio capture features discussed herein can be implemented in any device that is either microphone enabled, or any device having access to microphone enabled devices.

Details of library 904 are shown in FIG. 9B, according to some embodiments. Library 904 includes commands that applications and devices may use to cause the media device 114 to perform functions, such as capturing voice data from users 136.

In some embodiments, library 904 includes a plurality of rows 926-934 each representing a command. Each row 926-934 specifies a function 920, a command 922 for performing the function, and parameters 924 (if any) of the command. For example, in order to command media device 114 to capture audio for some period of time, an application or device may issue a bulk audio capture command of row 926. The parameters of this command may include, for example, the microphone to use to capture the command (such as microphone 907 in the media device 114, microphone(s) 126 in the audio responsive electronic device 122, a microphone (not shown) in remote control 138, etc.) The parameters may also include a time period for capturing the audio, such as "10 minutes" (indicating the audio should be captured upon receipt of the command, and for 10 minutes thereafter), or a start date/time for beginning the audio capture, and a stop date/time for ending the audio capture.

As another example, an application or device may issue a begin audio capture command of row 928, in order to cause the media device 114 to begin capturing audio. The parameters of this command may include, for example, the microphone to use to capture the command. The application or device may issue an end audio capture command of row 930, in order to cause the media device 114 to discontinue capturing audio.

The library 904 may include other commands for controlling the quality of the audio capture, such as an audio sample rate command of row 932, and an audio bit depth command of row 934, to name just some examples.

Figure 10:
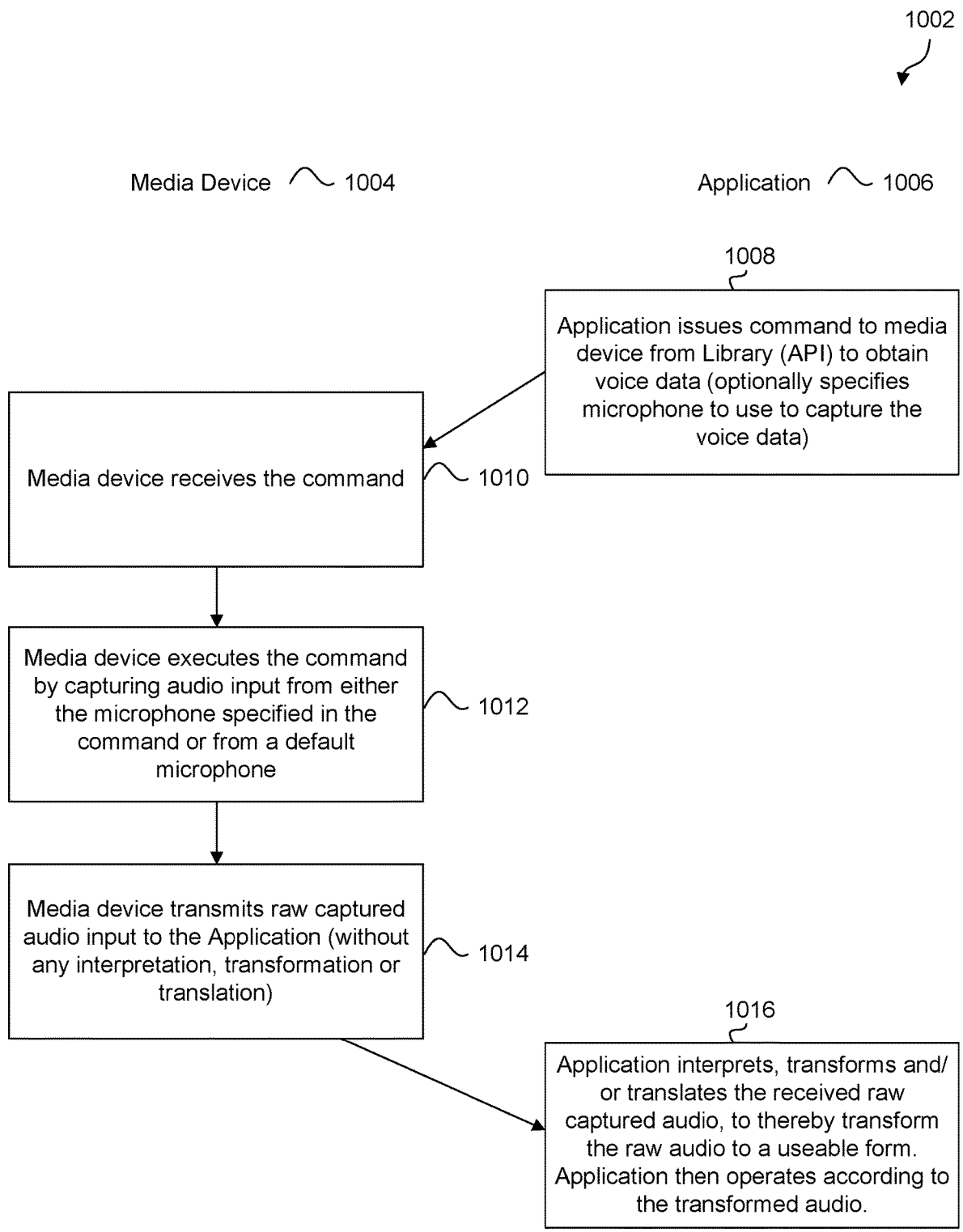
FIG. 10 illustrates a method for capturing and providing raw, unprocessed audio data to an application or device, according to some embodiments.

FIG. 10 illustrates a method 1002 for capturing and providing raw, unprocessed audio data to an application or device, according to some embodiments. Method 1002 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

For illustrative and non-limiting purposes, method 1002 shall be described with reference to FIGS. 1, 9A and 9B. However, method 1002 is not limited to those examples.

In 1008, an application 1006 may issue a command to the media device 1004 to cause the media device 1004 to capture audio of any person, device or entity in vicinity of media device 1004. To perform step 1008, the application may use one or more commands that conform with the API of media device 1004 represented by library 904. For example, the application 1006 may issue a begin audio command capture command of row 928 of library 904. In doing so, application 1006 may specify the microphone for performing the capture, and/or issue additional commands to specify the audio quality (such as the audio sample rate command of row 932 or the audio bit depth command of row 934). In other embodiments, the microphone is not specified in the command issued in 1008.

Application 1006 may be any of digital assistant(s) 180, software applications and/or services 181, appliances 183, and/or any other component in system 102 (including any other device, service or app of the Internet of Things), to name just some examples. Media device 1104 may be media device 114 shown in FIGS. 1 and 8, for example.

In 1010, the media device 1004 may receive the command from application 1006 over network 118.

In 1012, the processing module 902 of the media device 1004 may execute the received command by capturing audio using the microphone(s) specified by the received command. In the example of FIG. 1, such microphone(s) may be microphone 907 in the media device 114, microphone(s) 126 in the audio responsive electronic device 122, a microphone (not shown) in remote control 138, and/or a microphone in any other microphone-enabled device or component of system 102, that is assessable to and controllable by the media device 1004. In some embodiments, the audio may be sampled and captured using pulse code modulation (PCM) techniques, although this disclosure is not limited to that example.

As noted above, in some embodiments, the microphone is not specified in the received command. In such embodiments, in 1012 the media device 1004 may execute the received command by capturing audio using a default microphone, or a microphone previously identified by the user 136. In other embodiments, the media device 1004 may identify a position of user 136 using any of the approaches discussed herein (see FIGS. 3-5, for example). The media device 1004 in 1012 may then capture audio using the microphone in the media system 102 that is located closest to the determined position of the user 136 (in such embodiments, the locations of the microphone-enabled devices in media system 102 may have been previously specified by user 136).

Optionally, the application 1006 may issue additional commands to control the capture of audio by the media device 1004. For example, the application 1006 may issue an end audio capture command of row 930 of library 904 to discontinue the capture of audio by the media device 1004.

The media device 1004 may buffer the captured audio in the data storage 906 until it is provided to the application 1006. But, in accordance with embodiments, the media device 1004 does not interpret, transform, translate or in any way process or manipulate the received audio data. Instead, in embodiments, the media device 1004 stores the raw, unprocessed audio in the data storage 906.

In 1014, the media device 1004 may transmit the raw, unprocessed audio to the application 1006 over network 118.

In 1016, the application 1006 may receive the raw, unprocessed audio from media device 1004. Such raw audio may not be in a form useable by application 1006. Accordingly, the application 1006 may interpret, transform, translate, manipulate or otherwise process the raw audio as needed to convert the raw audio to a form useable by application 1006. The application 1006 may then use the converted, transformed audio in application specific ways, such as for voice memos or reminders, voice responsive commands, etc. Alternatively or additionally, the application 1006 may convert the transformed audio to text, and then use the text for further processing.

Example Computer System

Figure 11:
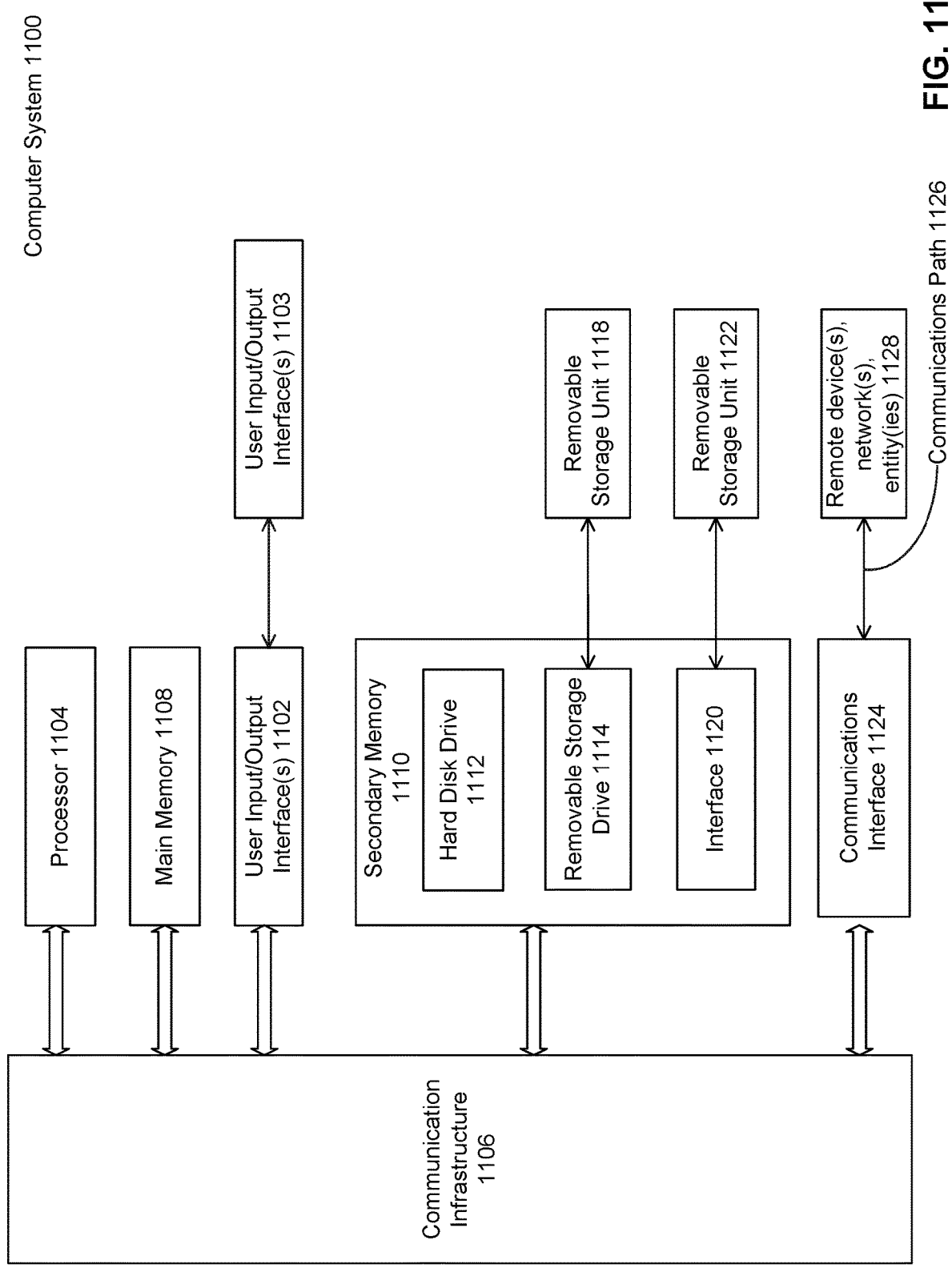
FIG. 11 is an example computer system useful for implementing various embodiments.

Various embodiments and/or components therein can be implemented, for example, using one or more computer systems, such as computer system 1100 shown in FIG. 11. Computer system 1100 can be any computer or computing device capable of performing the functions described herein. For example, one or more computer systems 1100 can be used to implement the operations of FIGS. 3-5, 7 and 10.

Computer system 1100 includes one or more processors (also called central processing units, or CPUs), such as a processor 1104. Processor 1104 is connected to a communication infrastructure or bus 1106.

One or more processors 1104 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 can include one or more levels of cache. Main memory 1108 has stored therein control logic (i.e., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 can include other means, instrumentalities or other approaches for allowing computer programs and/or other instructions and/or data to be accessed by computer system 1100. Such means, instrumentalities or other approaches can include, for example, a removable storage unit 1122 and an interface 1120. Examples of the removable storage unit 1122 and the interface 1120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 can allow computer system 1100 to communicate with remote devices 1128 over communications path 1126, which can be wired and/or wireless, and which can include any combination of LANs, WANs, the Internet, etc. Control logic and/or data can be transmitted to and from computer system 1100 via communication path 1126.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible, non-transitory articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. An audio responsive remote control, comprising:
a microphone array;
a beam-forming module configured for enhancement of an audio stream from a command source and de-enhancement of a background audio stream from a background source; and
at least one processor configured to:
  receive a trigger command, wherein the trigger command comprises a first keyword or a second keyword, wherein the first keyword is associated with a user and the second keyword is associated with a display device;
  identify, based on a keyword in the trigger command, the user as the identified command source and the display device as the identified background source responsive to determining that the trigger command comprises the first keyword;
  identifying the display device as the identified command source and the user as the identified background source responsive to determining that the trigger command comprises the second keyword;
  determine a first position of the identified background source relative to the audio responsive remote control;
  perform, based on the first position of the identified background source, the de-enhancement of the background audio stream from the identified background source;
  determine, based on receiving the trigger command, a second position of the identified command source; and
  perform, based on the second position of the identified command source, the enhancement of the audio stream from the identified command source to form an enhanced audio stream.

2. The audio responsive remote control of claim 1, wherein the first position of the identified background source is determined based on a first configuration setting and the second position of the identified command source is determined based on a second configuration setting, wherein the first configuration setting and the second configuration setting are stored in a memory of the audio responsive remote control.

3. The audio responsive remote control of claim 1, wherein to perform the de-enhancement, the at least one processor is further configured to:
identify one or more microphones of the microphone array based on a proximity of the one or more microphones to the first position of the identified background source; and
deactivate the one or more microphones.

4. The audio responsive remote control of claim 1, wherein to perform the de-enhancement, the at least one processor is further configured to:
receive the background audio stream from a media device over a network connection;
receive, by the microphone array, audio data;
match the background audio stream to the audio data;
identify one or more microphones of the microphone array based on the matching; and
adjust, by the beam-forming module, a reception pattern of the one or more microphones of the microphone array.

5. The audio responsive remote control of claim 4, wherein to adjust the reception pattern, the beam-forming module is further configured to perform one of:
- null audio reception of the one or more microphones; and
- subtract the audio data from combined audio data received by the microphone array.

6. The audio responsive remote control of claim 1, wherein to perform the enhancement, the at least one processor is further configured to:
- identify one or more microphones of the microphone array based on a signal amplitude of the one or more microphones when the trigger command was received; and
- adjust, by the beam-forming module, a reception pattern of the one or more microphones.

7. The audio responsive remote control of claim 1, wherein when the identified command source is the display device, the audio stream is part of an audio track of content provided by the display device, and the audio responsive remote control is a media device.

8. The audio responsive remote control of claim 7, wherein the at least one processor is further configured to:
- detect, from the enhanced audio stream, an audio command; and
- retrieve, based on the audio command, additional content associated with the audio track of content provided by the display device.

9. The audio responsive remote control of claim 7, wherein the at least one processor is further configured to:
- receive, by the audio responsive remote control, a second trigger command;
- determine, based on content of the second trigger command, another command source based on the second trigger command, wherein the content of the second trigger command identifies the another command source; and
- perform, based on the determining, another enhancement of another audio stream received from the another command source.

10. A non-transitory, tangible computer-readable medium having instructions stored thereon that, when executed by at least one computing device, cause the at least one computing device to perform operations for enhancement of an audio stream from a command source and de-enhancement of a background audio stream from a background source in an audio responsive remote control, the operations comprising:
- receiving, by the audio responsive remote control from an application, a trigger command, wherein the trigger command comprises a first keyword or a second keyword, wherein the first keyword is associated with a user and the second keyword is associated with a display device, and wherein the trigger command is configured to cause the audio responsive remote control to record the audio stream and wherein the application is remote from the audio responsive remote control;
- identifying, based on a keyword in the trigger command, the user as the identified command source and the display device as the identified background source responsive to determining that the trigger command comprises the first keyword;
- identifying the display device as the identified command source and the user as the identified background source responsive to determining that the trigger command comprises the second keyword;
- determining, by the audio responsive remote control, a first position of the identified background source relative to the audio responsive remote control;
- performing, based on the first position of the identified background source, the de-enhancement of the background audio stream from the identified background source;
- determining, by the audio responsive remote control and based on receiving the trigger command, a second position of the identified command source;
- performing, based on the second position of the identified command source, the enhancement of the audio stream from the identified command source to form an enhanced audio stream;
- recording, by the audio responsive remote control and responsive to receiving the trigger command, the enhanced audio stream; and
- transmitting the recorded enhanced audio stream to the application.

11. The non-transitory, tangible computer-readable medium of claim 10, wherein the first position of the identified background source is determined based on a first configuration setting and the second position of the identified command source is determined based on a second configuration setting, wherein the first configuration setting and the second configuration setting are stored in a memory of the audio responsive remote control.

12. The non-transitory, tangible computer-readable medium of claim 10, wherein when the identified command source is the display device, the audio stream is part of an audio track of content provided by the display device and wherein the audio responsive remote control is a media device.

13. The non-transitory, tangible computer-readable medium of claim 12, the operations further comprising:
- detecting, from the enhanced audio stream, an audio command; and
- retrieving, by the media device and based on the audio command, additional content associated with the audio track of content provided by the display device.

14. The non-transitory, tangible computer-readable medium of claim 10, wherein the audio responsive remote control comprises a microphone array and wherein performing the de-enhancement further comprises:
- identifying one or more microphones of the microphone array based on a proximity of the one or more microphones to the first position of the identified background source; and
- deactivating the one or more microphones.

15. The non-transitory, tangible computer-readable medium of claim 10, wherein the audio responsive remote control comprises a microphone array and a beam-forming module, and wherein performing the de-enhancement further comprises:
- receiving, by the audio responsive remote control, the background audio stream from a media device over a network connection;
- receiving, by the microphone array, audio data;
- matching the background audio stream to the audio data;
- identifying one or more microphones of the microphone array based on the matching; and
- adjusting, by the beam-forming module, a reception pattern of the one or more microphones of the microphone array.

16. The non-transitory, tangible computer-readable medium of claim 15, wherein adjusting the reception pattern further comprises one of:
- nulling audio reception of the one or more microphones; and subtracting the audio data from combined audio data received by the microphone array.

17. The non-transitory, tangible computer-readable medium of claim 10, wherein the audio response remote control comprises a microphone array and a beam-forming module, and wherein performing the enhancement further comprises:

identifying one or more microphones of the microphone array based on a signal amplitude of the one or more microphones when the trigger command was received; and adjusting, by the beam-forming module, a reception pattern of the one or more microphones.

18. The non-transitory, tangible computer-readable medium of claim 10, the operations further comprising:

receiving, by the audio responsive remote control, a second trigger command;

determining, based on content of the second trigger command, another command source based on the second trigger command, wherein the content of the second trigger command identifies the another command source; and performing, based on the determining, another enhancement of another audio stream received from the another command source.

* * * * *